(12) United States Patent
Huth et al.

(10) Patent No.: US 9,533,325 B2
(45) Date of Patent: Jan. 3, 2017

(54) SWITCHABLE SLOT VALVE FOR A COATING SYSTEM, COATING SYSTEM, AND COATING METHOD

(71) Applicant: VOLKSWAGEN VARTA Microbattery Forschungsgesellschaft mbH & Co. KG, Ellwangen Jagst (DE)

(72) Inventors: Andreas Huth, Ellwangen (DE); Robert Sekler, Ellwangen (DE)

(73) Assignee: VW-VM Forschungsgesellschaft mbH & Co, KG (DE)

( * ) Notice: Subject to any disclaimer, the term of this patent is extended or adjusted under 35 U.S.C. 154(b) by 0 days.

(21) Appl. No.: 14/430,297

(22) PCT Filed: Jul. 8, 2013

(86) PCT No.: PCT/EP2013/064394
§ 371 (c)(1),
(2) Date: Mar. 23, 2015

(87) PCT Pub. No.: WO2014/048599
PCT Pub. Date: Apr. 3, 2014

(65) Prior Publication Data
US 2015/0238998 A1    Aug. 27, 2015

(30) Foreign Application Priority Data
Sep. 27, 2012   (DE) .................... 10 2012 217 682

(51) Int. Cl.
B05C 5/02      (2006.01)
H01M 4/04     (2006.01)
F16K 5/04      (2006.01)

(52) U.S. Cl.
CPC .......... B05C 5/0233 (2013.01); B05C 5/0258 (2013.01); F16K 5/04 (2013.01); H01M 4/0402 (2013.01)

(58) Field of Classification Search
CPC ........ F16K 5/04; B05C 5/0233; B05C 5/0258; H01M 4/0402
USPC .. 137/625.11, 625.16, 625.47, 876; 251/309; 239/436, 443; 118/315, 411
See application file for complete search history.

(56) References Cited

U.S. PATENT DOCUMENTS

| | | | | |
|---|---|---|---|---|
| 1,081,688 | A | * 12/1913 | Mohl | ........................ B05B 1/18 137/625.42 |
| 6,024,299 | A | 2/2000 | Drozkowski | |
| 6,174,372 | B1 | * 1/2001 | Yoshinaga | ............ B05C 5/0258 118/674 |

(Continued)

FOREIGN PATENT DOCUMENTS

| | | |
|---|---|---|
| CN | 2766974 | 3/2006 |
| DE | 19714029 A1 | 10/1998 |

(Continued)

*Primary Examiner* — Marina Tietjen
(74) *Attorney, Agent, or Firm* — DLA Piper LLP (US)

(57) ABSTRACT

A switchable slot valve for a coating plant controls delivery of a pasty coating material. The switchable slot valve has a valve bore incorporated in a valve main body and is aligned in a valve extent direction, and a valve control rod is rotatable to switch between a throughput position and a closed position and is mounted in the valve bore by bearing faces. To mitigate disruptions by coating material which has made its way into a bearing gap between the valve bore and the bearing faces at least one receiving space is incorporated in an inner circumferential face of the valve bore between the supply duct and the nozzle duct.

15 Claims, 1 Drawing Sheet

(56) References Cited

U.S. PATENT DOCUMENTS

2007/0119368 A1  5/2007  Perttila et al.

FOREIGN PATENT DOCUMENTS

| | | | | |
|---|---|---|---|---|
| DE | 10047184 A1 * | 4/2002 | ........... | B05C 5/0225 |
| DE | 102010017965 A1 | 10/2011 | | |
| GB | GB 191020698 A * | 0/1911 | ............... | F16K 5/04 |
| GB | 108199 | 7/1917 | | |
| GB | 564557 | 10/1944 | | |
| JP | 2002-45782 | 2/2002 | | |
| WO | 2004/069519 A1 | 8/2004 | | |

* cited by examiner

SWITCHABLE SLOT VALVE FOR A COATING SYSTEM, COATING SYSTEM, AND COATING METHOD

TECHNICAL FIELD

This disclosure relates to a switchable outlet valve for a coating plant to control delivery of a pasty coating material. The disclosure also relates to a coating plant having a switchable slot valve and a method of coating surfaces.

BACKGROUND

Generic switchable slot valves for coating plants are known. Valves of this type display a valve bore, aligned in a valve extent direction, which is in a valve main body and into which a supply duct opens and from which a nozzle duct leads out to connect to a slot nozzle of the coating plant. Disposed in the valve bore of a known slot valve is a valve control rod mounted in the valve bore to be rotatable about a rotation axis which extends in the valve extent direction and is penetrated by a valve duct which disposes of a duct inlet extending axially along an outer side of the valve control rod and a suchlike opposite duct outlet, the former and latter being interconnected by a valve duct which penetrates the valve control rod.

In those known slot valves, the valve control rod can be rotated between a throughput position and a closed position by a motor. In the throughput position, the valve control rod is disposed such that the coating material supplied through the supply duct can make its way through the duct inlet into the valve duct and from there through the duct outlet into the nozzle duct, from where it is supplied according to the intended use to the slot nozzle of the coating plant. In contrast, in the closed position, the nozzle duct is isolated from the supply duct by the valve control rod such that the deployment of coating material is interrupted.

To mount the valve control rod in the valve bore, the valve control rod on its outer side displays bearing faces which, for mounting in the region of two part-circumferences of the valve control rod, between the duct inlet and the duct outlet, bear on the circumferential face of the valve bore. Since the valve control rod is rotatable, there remains in the bearing region a bearing gap of at maximum 100 µm between the bearing faces and the inner circumferential face of the valve bore.

Generic slot valves control in a targeted manner delivery of the coating material through a slot nozzle. For this purpose, they are upstream of the slot nozzle and by rotation of the valve control rod enable temporary interruption of the supply of the coating material to the slot nozzle. This is particularly used to deliver coating material through the slot nozzle and interrupt delivery in an alternating manner.

Generic coating plants having generic slot valves are used in the manufacture of batteries, in particular. In this context, they deploy a pasty coating material which, in particular, contains electrochemically active particles such as graphite particles, for example, in the form of a thin layer. In particular, the layer may be applied as an electrode layer immediately onto a suitable collector of the battery. However, a coating is also understood to be the temporary application onto a carrier substrate such as a roller or a planar carrier substrate, for example, from which according to the intended use the layer formed by the coating material is removed again in later production steps, for example, for application onto a collector strip.

Apart from deployment of a coating material having electrochemically effective particles for the manufacture of a battery, coating plants of that type may also be used to manufacture an electrocatalytic layer of a fuel cell. In that case, in particular coating materials which contain catalyst particles (precious metals, Raney nickel, tungsten carbide, molybdenum sulfides, tungsten sulfides, or similar suitable materials) as electrochemically active particles and which may catalyze the cold combustion of fuels such as hydrogen or methanol may be processed.

In generic coating plants, a paste reservoir from which the coating material is supplied to the slot valve and the downstream slot nozzle is usually located upstream of the slot nozzle. Both designs in which the paste reservoir per se is impinged with pressure to press the coating material in the direction of the slot valve as well as designs in which a separate motor-driven conveying means such as a pump, for example, is located between the paste reservoir and the slot valve are conceivable.

A slot valve is understood as a valve in which the supply duct, the nozzle duct, and the valve duct penetrating the valve control rod, in a dimension transverse in relation to the conveying direction, display a considerably larger extent than in the dimension which extends thereto in an orthogonal manner and is likewise transverse in relation to the conveying direction. The extent of the respective ducts in the valve extent direction according to the definition of a slot valve is at least larger by a factor of 4 than the extent transverse to the valve extent direction. With respect to the valve control rod it displays a length in the valve extent direction, along which the valve control rod is penetrated by the valve duct, that is at least four times the mean radius of the valve control rod. Preferably and most commonly, the length of the valve control rod, along which it is penetrated by the valve duct, is larger than the radius of the valve control rod by a greater factor, preferably by at least a factor of 10.

The mentioned correlation between the radius and diameter of the valve control rod, on the one hand, and its length, on the other hand, in practice leads to difficulties. It has emerged, for example, that coating material which makes its way into the narrow gap between the inner circumference of the valve bore and the bearing face of the valve control rod causes the momenta required to readjust the slot valve to surge as the period of operation increases.

This is caused by the tendency of many coating materials and in particular coating materials used in the context of the manufacture of batteries toward significantly increasing their viscosity at a high shear load, depending on the degree and duration of shearing (rheopectic behavior). The longer remnants of the coating material remain between the inner circumferential face of the valve bore and the bearing faces, the greater their viscosity. In practice, the actuators provided on generic slot valves to switch the slot valve can no longer effect a reliable valve switching operation after a certain operating period such that use of the coating plant has to be interrupted and the valve bore has to be cleaned.

It could therefore be helpful to provide a switchable slot valve of the generic type such that the slot valve functions in a maintenance-free manner over a comparatively long period of time.

SUMMARY

We provide a switchable slot valve for a coating plant that controls delivery of a pasty coating material including a valve bore incorporated in a valve main body and aligned in a valve extent direction, a supply duct disposed in a region of an inner circumferential face of the valve bore and opens into the valve bore, a nozzle duct disposed in the region of the inner circumferential face of the valve bore and leads out of the valve bore, and a valve control rod disposed in the valve bore and mounted in the valve bore to be rotatable about a rotatable rotation axis extending in the valve extent direction and penetrated by a valve duct which disposes of a slot-shaped duct inlet and a slot-shaped duct outlet, wherein the valve control rod in the valve bore is rotatable between a throughput position and a closed position, wherein, in the throughput position, the supply duct and the nozzle duct interconnect to communicate via the valve duct, and wherein, in the closed position, the nozzle duct is isolated from the supply duct by the valve control rod, the valve control rod comprises external bearing faces which, for mounting in a region of part-circumferences of the valve control rod between the duct inlet and the duct outlet, bear on the inner circumferential face of the valve bore, and to receive coating material, at least one receiving space is incorporated in the inner circumferential face of the valve bore between the supply duct and the nozzle duct.

We further provide a coating plant that coats surfaces with a pasty coating material in a continuous method, including: a supply unit that supplies the coating material by a supply duct, a switchable slot valve located downstream of the supply duct, a nozzle duct located downstream of the slot valve, and a slot nozzle located downstream of the nozzle duct that deploys the coating material onto the surface to be coated therewith.

We yet further provide a method of deploying a coating material on a surface including deploying the coating material by the coating plant.

DETAILED DESCRIPTION

Figure 1:
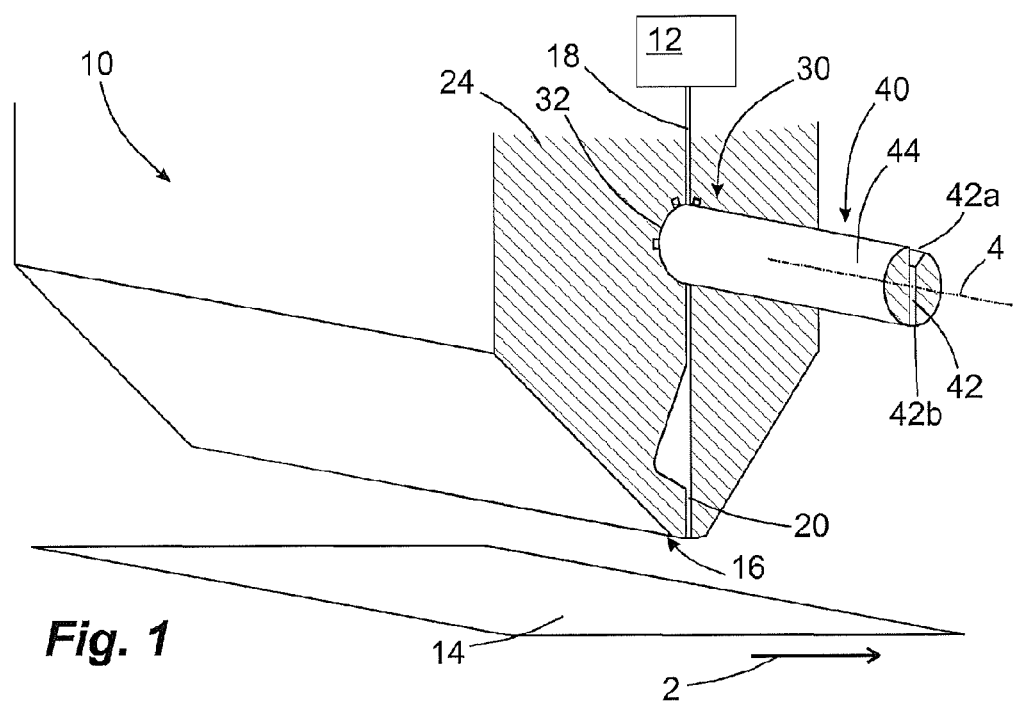
FIG. 1 shows a coating plant in a sectional illustration.

We provide slot valves that, for the purpose of receiving coating material from a bearing gap between the bearing faces and the inner circumferential faces of the valve bore, have at least one receiving space incorporated in the inner circumferential face of the valve bore between the supply duct and the nozzle duct.

Our slot valves have the above-described features of generic slot valves. The valve main body preferably is a metallic main body into which the valve bore is incorporated using, in particular, metal-cutting machining. The valve bore per se is a rotationally symmetrical and preferably cylindrical clearance, the length of which is at least four times the mean radius. The valve bore does not inevitably have to have a cylindrical shape, but may also be conical, for example. The supply duct opens into the valve bore, and the nozzle duct leads off from the valve bore, wherein both ducts connect to the valve bore by slot-type openings primarily extending in the valve extent direction. The absolute length of the valve bore and the substantially identical width of the supply duct and the nozzle duct in the region of the circumferential face of the valve bore and the valve duct are at least 30 mm, preferably at least 100 mm. Depending on the purpose of the application, the length of the valve bore, or the width of the respective ducts, respectively, may be up to 2000 mm and more. The mean diameter of the valve bore, in particular the diameter of the cylindrical valve bore, preferably is <30 mm. The width of the mouth of the supply duct and the exit into the nozzle duct preferably exceeds, or is at least, respectively, four times the height of the mouth or of the exit, respectively.

The at least one receiving space is provided as a depression in the region of the circumferential face of the valve bore, and thus extends outwardly from the bearing gap and the external bearing faces of the valve control rod. While the bearing gap preferably displays a mean width of less than 100 μm, in particular preferably less than 50 μm, it is enlarged in the region of the at least one receiving space by the depth of the receiving space. The receiving space preferably displays a depth in the radial direction of at least 1 mm, preferably of at least 3 mm.

On account of the at least one receiving space, at least one further point is provided on the inner circumferential face of the valve bore between the openings of the supply duct and of the nozzle duct, at which the inner circumferential face of the valve bore is interrupted. The receiving space preferably is formed by a receiving groove extending in the valve extent direction and has the mentioned depth. Instead, a plurality of receiving spaces which are mutually aligned or are disposed to be mutually offset in the circumferential direction may also be provided on the inner circumferential face of the valve bore. It is preferable for the one receiving space or the plurality of receiving spaces to extend across a length of at least 80% of the length of the bearing face in the valve extent direction, the bearing faces in this sense being considered as only that face that are provided between the mutually opposite ends of the valve duct, when viewed in the valve extent direction.

In practice, the at least one receiving space or the receiving spaces have the effect that the problem described at the outset with the coating material becoming rigid on account of shear and the stiff movement of the valve control rod resulting therefrom does not arise or does not arise to the same extent. The receiving space or the receiving spaces allow(s) for previously heavily shear-stressed coating material to be received and thus be removed from the bearing gap.

The reason for the existence of the receiving space preventing or mitigating the mentioned problems presently cannot be unequivocally stated. Without being limited by the considerations regarding effectiveness which will be stated in the following, the mode of action in part may be tentatively explained in that previously particularly heavily shear-stressed coating material can divert into the receiving space. The effect could in part also be explained in that in particular elastic coating material which has accumulated in the receiving space is differently compressed and/or pressurized in the throughput position and the closed position of the slot valve such that, on account of the relaxation of the coating material in the receiving space which takes place in a fixed temporal cycle, movement of the coating material in the bearing gap is also caused on account of which previously heavily shear-stressed coating material is pressed back into the flow path of the coating material.

We found that an advantageous effect is achievable almost independently of where the receiving space which is preferably designed as a continuous receiving groove is disposed on the inner circumference of the valve bore. In this way, our slot valves comprise designs having a receiving space which always communicatively connects only to the bearing gap, independently of the valve position. However, designs in which at least one of the receiving spaces in the closed position or the throughput position communicatively connect to the duct inlet or the duct outlet of the valve control rod are also comprised, in particular. In these designs, the mentioned positive effect may probably be explained at least in that the receiving space which, in the respective other position of the slot valve, on both sides communicatively connects to only the bearing gap, in the closed position or the throughput position immediately connects to the duct inlet or duct outlet and may thus be flushed by the coating material flowing in the throughput position. This probably leads to previously heavily shear-stressed parts of the coating material being re-added to the flow of the coating material and thus being carried away.

A design in which the arrangement of at least one of the receiving spaces and the design of the duct inlet of the valve duct are configured and mutually adapted such that in the closed position of the valve control rod a communicative connection exists between the mentioned receiving space and the supply duct has emerged as being particularly effective. In experiments, precisely such a configuration has led to the required momentum to switch the valve being only slightly increased as the operation period increases, and thus long-term, interruption-free operation of the coating plant being enabled.

For this communicative connection, in particular between the supply duct and the receiving space, to be enabled, the height of the slot-shaped duct inlet on the valve control rod in the circumferential direction is preferably larger than the height of the slot-shaped duct outlet on the valve control rod. The valve duct thus preferably displays a cross-sectional area which tapers off.

We also provide a coating plant that coats surfaces with a pasty coating material in a continuous method. This plant comprises a supply unit that supplies the coating material by a supply duct, the supply unit preferably comprising a pressurized paste reservoir or a pressure-free paste reservoir and a pump device. Such a coating plant also comprises a switchable valve, a nozzle duct downstream of the slot valve, and a slot nozzle downstream of the nozzle duct to deploy the coating material onto the surface to be coated therewith or the substrate to be coated therewith at times. The slot valve here is configured in the manner described above.

The supply unit preferably comprises a paste reservoir in which a coating material which is suitable for the manufacture of batteries is held ready, that is to say in particular a coating material having electrochemically active particles which may serve in the manufacture of an electrode.

We furthermore provide a method of coating a surface in which the described coating plant is used. This is preferably a method of delivering a coating material which forms a battery electrode.

Further aspects and advantages are derived, apart from the claims, also from the following description of a preferred example which is explained by means of the illustrations.

FIG. 1 shows a coating plant in a sectional schematic illustration.

This coating plant 10 deploys a coating material stored in a paste reservoir 12 prior to being deployed. According to the intended use, the coating material is applied to a substrate 14 which is continuously conveyed past the coating plant 10 in the direction of the arrow 2. The coating plant 10 has a slot-shaped deployment nozzle 16 to deploy the coating material, which has a width of 300 mm. Depending on the application purpose, widths between 30 mm and 2000 mm and beyond are possible.

A switchable slot valve 30 is provided between the paste reservoir 12 and the slot nozzle 16. The switchable slot valve 30 is primarily formed by a substantially cylindrical valve bore 32 in a main body 24 as well as by a valve control rod 40 inserted in valve bore 32.

The valve control rod 40 may be rotated about a valve axis 4, which is aligned in the valve extent direction by an actuator (not illustrated) such as an electric motor, a hydraulic actuator, or pneumatic actuator. On account thereof, the slot valve 30 may selectively assume a throughput position (illustrated in FIG. 2a) or a closed position (illustrated in FIG. 2b). To this end, it is provided that a valve duct 42 penetrating the valve control rod 40 is collectively rotated with the valve control rod 40. The valve duct 42 may thus be brought into communicative connection in relation to a supply duct 18 which leads from the paste reservoir 18 to the valve bore 32 and a nozzle duct 20 which leads from the valve bore 32 to the slot nozzle 16.

Figures 2A, 2B:
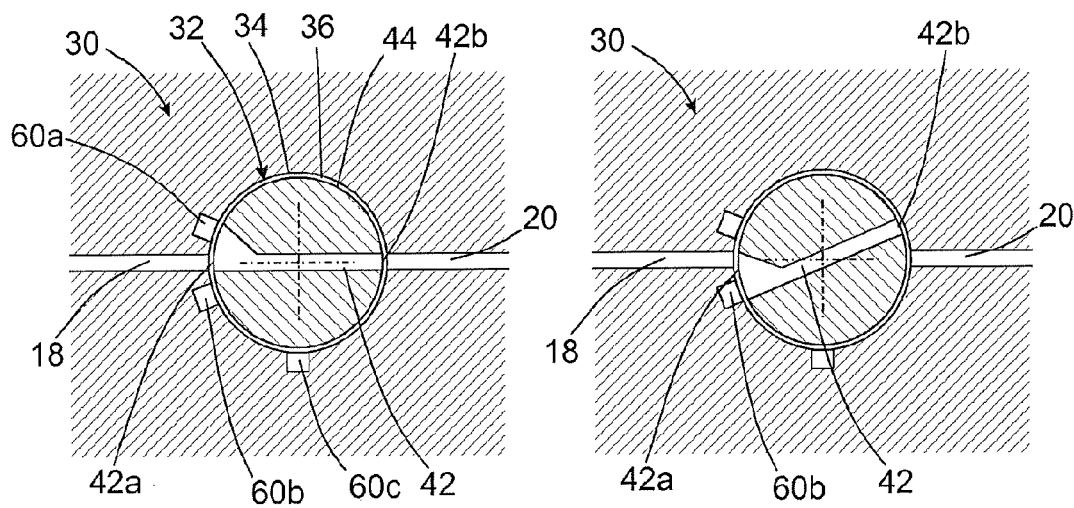
FIGS. 2a and 2b show the slot valve of the coating plant of FIG. 1, in a sectional lateral illustration, in the throughput state and in the closed state.

FIG. 2a shows the throughput state in which the duct inlet 42a is in alignment with the supply duct 18, while the duct outlet 42b is in alignment with the nozzle duct 20. The pasty coating material may thus make its way in an unencumbered manner from the paste reservoir 12 to the slot nozzle 16.

In contrast thereto, in the closed position of FIG. 2b, the duct outlet 42b is no longer in alignment with the nozzle duct 20 such that the supply of coating material to the nozzle duct 20 and the nozzle 16 is interrupted.

As can be derived from FIGS. 2a and 2b, a narrow bearing gap 36 remains between a cylindrical external bearing face 44 of the valve control rod 40 and the inner circumferential face 34 of the valve bore 32. For the purpose of clarity, the bearing gap 36 is illustrated to be larger than in reality in the illustrations. Although the bearing gap 36 usually does not exceed a width of 20 μm to 30 μm, coating material cannot be prevented from making its way into this bearing gap 36.

Coating material which is used, for example, as electrode material in the manufacture of batteries and according to the intended use is deployed onto the substrate 14 using the coating plant 10, has the tendency of being subjected to a considerable increase in viscosity under shearing, depending on the design of the coating material. Shearing is very intense, particularly in the bearing gap 36 since the spacing between the bearing faces 44 and the inner circumferential face 34 of the valve bore 32 is very modest. The coating material disposed in the bearing gap 36 thus threatens to cause jamming of the valve control rod 40, which can only be removed by cleaning the valve bore 32 first.

For this effect not to be allowed to occur or for it to be mitigated, a total of three groove-type receiving spaces 60a, 60b, 60c, preferably extending in the valve extent direction 4 across almost the entire length (>80%) of the valve control rod 40, are provided on the inner circumferential face 34 of the valve bore. These receiving spaces 60a, 60b, 60c connect to the supply duct 18 or the nozzle duct 20, respectively, only via the valve bore 32. By way of the valve control rod 40, they are isolated in relation to the supply duct 18 and the nozzle duct 20 at least in a phased manner. As is clarified by comparing FIGS. 2a and 2b, the receiving space 60a, in the throughput position of the slot valve 30 connects to the valve inlet, this being achieved by a funnel-type widening of the duct inlet 42a at the entry of the valve duct 42. At the same time, in the throughput position of FIG. 2a, the receiving spaces 60b, 60c are isolated in relation to the supply duct 18, the valve duct 42, and the nozzle duct 20.

In the closed position of FIG. 2b, merely the receiving space 60b communicatively connects to the valve duct 42 and the supply duct 18, while the receiving spaces 60a, 60c are isolated in relation to the supply duct 18.

The existence of the receiving spaces 60a, 60b, 60c leads to considerable mitigation of the increase in stiff movement at extended disruption-free operation. The three receiving spaces 60a, 60b, 60c here are only implemented in a common example for the purpose of visualization. Each of these receiving spaces could also be provided as a single receiving space and would lead to a reduction in the mentioned stiff movement.

The receiving spaces 60a, 60b, 60c all receive coating material supplied through the bearing gap 36. While the receiving space 60c always communicatively connects to the supply duct 18 only via the bearing gap 36, independently of the position of the valve control rod, the receiving spaces 60a and 60b connect to the valve duct 42 on a case-to-case basis. This causes a flushing process by way of which particularly highly shear-stressed coating material which has previously made its way into the respective receiving space is pressed out and/or flushed out again from the respective receiving space 60a, 60b and supplied to the nozzle duct 20.

An arrangement of the receiving space corresponding to that of the receiving space 60b has emerged as being particularly advantageous, that is to say an arrangement of the receiving space 60b in such a manner that the latter, in the closed position of the slot valve 30, communicatively connects to the valve duct 42.

The invention claimed is:

1. A switchable slot valve for a coating plant that controls delivery of a pasty coating material comprising:
 a valve bore incorporated in a valve main body and aligned in a valve extent direction,
 a supply duct disposed in a region of an inner circumferential face of the valve bore and opens into the valve bore,
 a nozzle duct disposed in the region of the inner circumferential face of the valve bore and leads out of the valve bore, and
 a valve control rod disposed in the valve bore and mounted in the valve bore to be rotatable about a rotatable rotation axis extending in the valve extent direction and penetrated by a valve duct which disposes of a slot-shaped duct inlet and a slot-shaped duct outlet, wherein:
 the valve control rod in the valve bore is rotatable between a throughput position and a closed position, wherein, in the throughput position, the supply duct and the nozzle duct interconnect to communicate via the valve duct, and wherein, in the closed position, the nozzle duct is isolated from the supply duct by the valve control rod,
 the valve control rod comprises external bearing faces which, for mounting in a region of part-circumferences of the valve control rod between the duct inlet and the duct outlet, bear on the inner circumferential face of the valve bore, and
 to receive coating material, at least one receiving space incorporated in the inner circumferential face of the valve bore that is separate from and located between the supply duct and the nozzle duct.

2. The switchable slot valve as claimed in claim 1, wherein the at least one receiving space is configured as a receiving groove extending in the valve extent direction.

3. The switchable slot valve as claimed in claim 1, wherein the receiving space or the receiving spaces extend across at least a length of 80% of a length of the bearing face in the valve extent direction.

4. The switchable slot valve as claimed in claim 1, wherein an arrangement of at least one of the receiving spaces and a design of the duct inlet of the valve duct are configured and mutually adapted such that in a closed position of the valve control rod a communicative connection exists between the receiving space and the supply duct.

5. The switchable slot valve as claimed in claim 1, wherein a height of the slot-shaped duct inlet on the valve control rod in a circumferential direction is larger than a height of the slot-shaped duct outlet on the valve control rod.

6. A coating plant that coats surfaces with a pasty coating material in a continuous method, comprising:
 a supply unit that supplies the coating material by a supply duct,
 a switchable slot valve located downstream of the supply duct,
 a nozzle duct located downstream of the slot valve, and
 a slot nozzle located downstream of the nozzle duct that deploys the coating material onto the surface to be coated therewith,
wherein the slot valve is configured as claimed in claim 1.

7. The coating plant as claimed in claim 6, wherein the supply unit comprises a paste reservoir containing coating material for the manufacture of batteries.

8. A method of deploying a coating material on a surface comprising deploying the coating material by a coating plant as claimed in claim 6.

9. The switchable slot valve as claimed in claim 2, wherein the receiving space or the receiving spaces extend across at least a length of 80% of a length of the bearing face in the valve extent direction.

10. The switchable slot valve as claimed in claim 2, wherein an arrangement of at least one of the receiving spaces and a design of the duct inlet of the valve duct are configured and mutually adapted such that in a closed position of the valve control rod a communicative connection exists between the receiving space and the supply duct.

11. The switchable slot valve as claimed in claim 3, wherein an arrangement of at least one of the receiving spaces and a design of the duct inlet of the valve duct are configured and mutually adapted such that in a closed position of the valve control rod a communicative connection exists between the receiving space and the supply duct.

12. The switchable slot valve as claimed in claim 2, wherein a height of the slot-shaped duct inlet on the valve control rod in a circumferential direction is larger than a height of the slot-shaped duct outlet on the valve control rod.

13. The switchable slot valve as claimed in claim 3, wherein a height of the slot-shaped duct inlet on the valve control rod in a circumferential direction is larger than a height of the slot-shaped duct outlet on the valve control rod.

14. The switchable slot valve as claimed in claim 4, wherein a height of the slot-shaped duct inlet on the valve control rod in a circumferential direction is larger than a height of the slot-shaped duct outlet on the valve control rod.

15. A method of deploying a coating material on a surface comprising deploying the coating material by a coating plant as claimed in claim 7.

* * * * *